US011869239B2

(12) United States Patent
Calvert et al.

(10) Patent No.: US 11,869,239 B2
(45) Date of Patent: Jan. 9, 2024

(54) AUTOMATIC CONFIGURATION OF ANALYTICS RULES FOR A CAMERA

(71) Applicant: Johnson Controls Tyco IP Holdings LLP, Milwaukee, WI (US)

(72) Inventors: William T. Calvert, Belfast (IE); Terence Neill, Lisburn (GB)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 16/996,604

(22) Filed: Aug. 18, 2020

(65) Prior Publication Data
US 2022/0058393 A1    Feb. 24, 2022

(51) Int. Cl.
*G06V 20/40*    (2022.01)
*H04N 23/62*    (2023.01)
*H04N 23/68*    (2023.01)

(52) U.S. Cl.
CPC .............. *G06V 20/41* (2022.01); *H04N 23/62* (2023.01); *H04N 23/681* (2023.01); *G06V 20/44* (2022.01)

(58) Field of Classification Search
CPC ..... G06K 9/00718; G06K 2009/00738; H04N 5/23216; H04N 5/23251
USPC ....................................................... 382/103
See application file for complete search history.

(56) References Cited

U.S. PATENT DOCUMENTS

| | | | |
|---|---|---|---|
| 10,997,423 B1* | 5/2021 | Borras | G06V 20/56 |
| 2004/0130620 A1* | 7/2004 | Buehler | G06K 9/32 |
| | | | 348/143 |
| 2009/0268024 A1* | 10/2009 | Tsukuda | H04N 21/4223 |
| | | | 348/143 |
| 2010/0260376 A1* | 10/2010 | Cobb | G06K 9/00785 |
| | | | 382/103 |
| 2011/0050897 A1* | 3/2011 | Cobb | G06K 9/00771 |
| | | | 348/143 |
| 2011/0211036 A1* | 9/2011 | Tran | G06F 3/005 |
| | | | 348/E7.083 |
| 2012/0062732 A1* | 3/2012 | Marman | G08B 13/19682 |
| | | | 348/142 |
| 2013/0128050 A1* | 5/2013 | Aghdasi | G06K 9/3241 |
| | | | 348/158 |
| 2015/0281710 A1* | 10/2015 | Sievert | H04N 5/23254 |
| | | | 375/240.02 |

* cited by examiner

*Primary Examiner* — Michael R Neff
(74) *Attorney, Agent, or Firm* — ArentFox Schiff LLP

(57) ABSTRACT

Example implementations include a method, apparatus and computer-readable medium for controlling a camera, comprising receiving a video sequence of a scene. The method includes determining one or more scene description metadata in the scene from the video sequence. The method includes identifying one or more scene object types in the scene based on the one or more scene description metadata. The method includes determining one or more rules based on one or both of the scene description metadata or the scene object types, each rule configured to generate an event based on a detected object following a rule-specific pattern of behavior. The method includes applying the one or more rules to operation of the camera.

19 Claims, 5 Drawing Sheets

AUTOMATIC CONFIGURATION OF ANALYTICS RULES FOR A CAMERA

TECHNICAL FIELD

The described aspects relate to method of controlling a camera and specifically to automatic configuration of analytics rules for a camera.

BACKGROUND

In the context video camera systems, manual configuration of rules for a camera may be a cumbersome process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of controlling a camera. The method includes receiving, at a processor from the camera, a video sequence of a scene. The method further includes determining, at the processor, one or more scene description metadata in the scene from the video sequence. The method further includes identifying, at the processor, one or more scene object types in the scene based on the one or more scene description metadata. The method further includes determining, at the processor, one or more rules based on one or both of the scene description metadata or the scene object types, wherein each rule is configured to generate an event based on a detected object following a rule-specific pattern of behavior. The method further includes applying, at the processor, the one or more rules to operation of the camera.

Another example implementation includes an apparatus for controlling a camera, comprising of memory and a processor in communication with the memory. The processor is configured to receive a video sequence of a scene. The processor is further configured to determine one or more scene description metadata in the scene from the video sequence. The processor is further configured to identify one or more scene object types in the scene based on the one or more scene description metadata. The processor is further configured to determine one or more rules based on one or both of the scene description metadata or the scene object types, wherein each rule is configured to generate an event based on a detected object following a rule-specific pattern of behavior. The processor is further configured to apply the one or more rules to operation of the camera.

Another example implementation includes a computer-readable medium computer-readable medium comprising stored instructions for controlling a camera, executable by a processor to receive a video sequence of a scene. The instructions are further executable to determine one or more scene description metadata in the scene from the video sequence. The instructions are further executable to identify one or more scene object types in the scene based on the one or more scene description metadata. The instructions are further executable to determine one or more rules based on one or both of the scene description metadata or the scene object types, wherein each rule is configured to generate an event based on a detected object following a rule-specific pattern of behavior. The instructions are further executable to apply the one or more rules to operation of the camera.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The method, apparatus and computer readable medium of the present application may automatically configure rules for operating a camera based on scene object types using video analytics.

The method, apparatus and computer readable medium for configuring rules for a camera may be based on video analytics object classification to automate the rules configuration process based on certain types of background objects. Video analytics, which may include artificial intelligence (AI) and/or machine learning (ML) based models for classifying objects, may detect a particular type of object, e.g., a doorway, in the background scene. The described aspects can automatically generate separate specific rules based objects following/not following a particular pattern of behavior, e.g., enter and exit rules around a detected door area. For example, if a person is detected to be entering or exiting the door area, the rules may produce an event, trigger an alarm, store the alarm/event, record a video clip for a particular timeframe.

The method, apparatus and computer readable medium can automate the process of video analytics rule creation, reducing the time and expense for customer installation and configuration of security cameras. This can provide significant savings in time, cost and effort for large security systems that may contain hundreds of cameras. Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
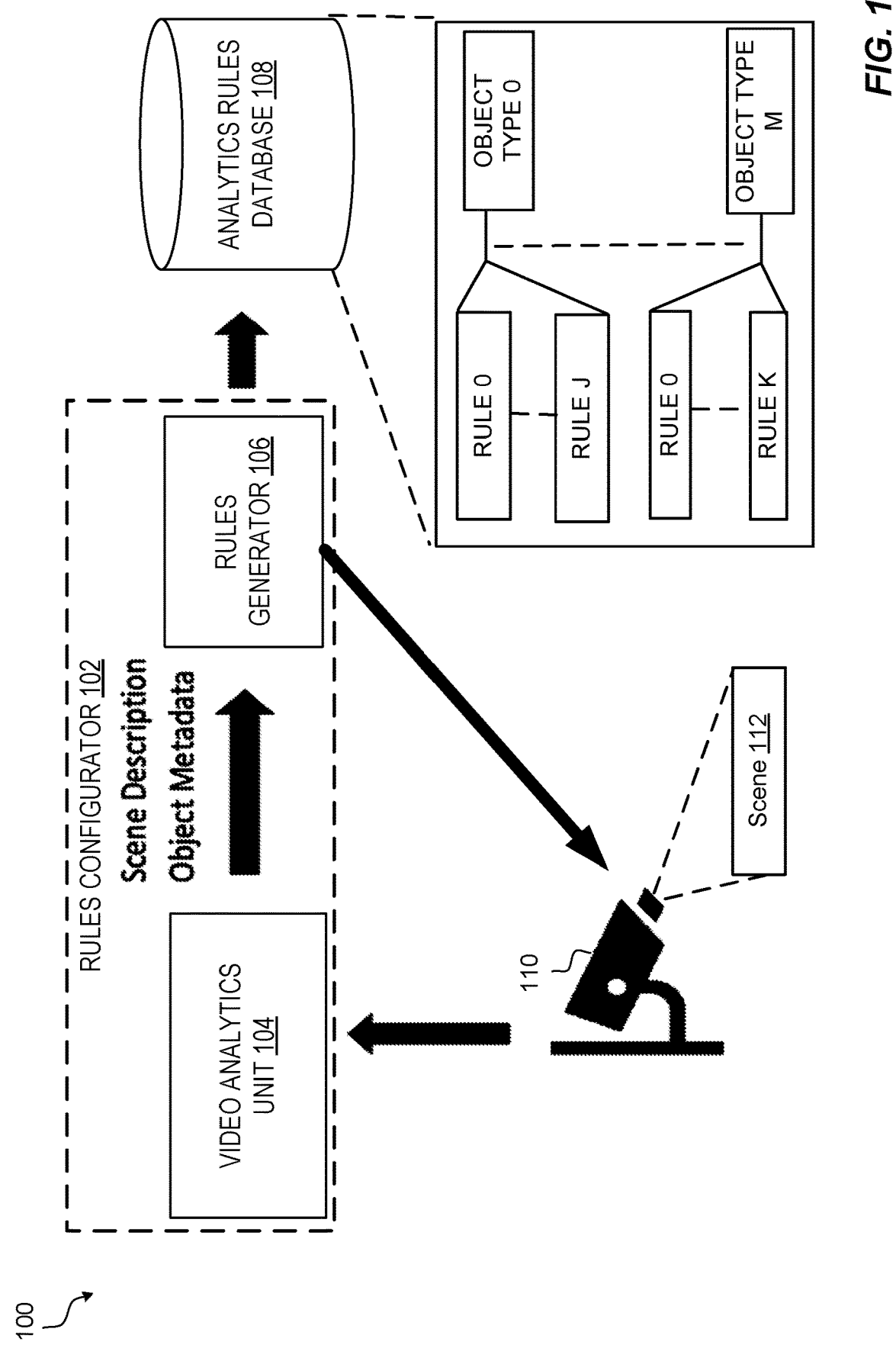
FIG. 1 is a schematic diagram of a system for configuring rules for a camera based on scene object types.

Referring to FIG. 1, a system 100 for configuring rules for a camera based on video analytics object classification includes a rules configurator 102. The rules configurator 102 includes a video analytics unit 104 that receives video sequence from a camera 110 monitoring a scene 112, which in one non-limiting example may include a parked car. The video analytics unit 104 may determine one or more scene description metadata in the scene from the video sequence (e.g., classify a scene as a parking garage). The video analytics unit 104 may identify one or more scene object types in the scene based on the one or more scene description metadata (e.g., identify a car as a scene object type in the parking garage). The scene description metadata may include one or more of motion detection, a rate of change of video frames, presence of an access controlled entrance, presence of an abandoned object in a public area, presence of a fence, presence of a wall, and presence of people in a queue, etc. The video analytics unit 104 may send the scene description metadata and/or the scene object types to a rules generator 106. The rules generator 106 may determine one or more rules based on the scene description metadata and/or the scene object types. For example, a rule may specify a region (e.g., a rectangular region, irregular shaped region or a pixel mask) of a scene where the rule is applies. In one example, an entry rule may specify a region covering a doorway where the rule applies to detect a person entering the doorway. The rules generator 104 may determine the region based on co-ordinates and/or size of the doorway object. The rules generator 106 may determine a rule such that each rule is configured to generate an event based on a detected object following a rule-specific pattern of behavior. For example, when the video analytics unit 104 detects a fence or a wall in a background of a scene, and sends the scene description metadata of the scene, the rules generator 106 may auto-generate a perimeter rule(s) along the fence or a boundary of the wall. The rule(s) may enable the system to generate an event (e.g., an alarm, begin recording of the video scene, etc.) if the system detects a person or object crossing the perimeter. In another example, the video analytics unit 104 may detect a retail checkout in the background scene and the rules generator 106 may auto-generate a queue rule at the checkout, e.g., the rule may monitor the queue size and produce an event if the queue reaches a specified length.

The rules generator 106 may store the rule(s) in an analytics rules database 108 based on the scene object types (e.g., Rule 0 to Rule J corresponding to Object Type 0, where 0 to J is any set of positive integers, Rule 0 to Rule K corresponding to Object Type M, where 0 to K and 0 to M are any set of positive integers) as shown in FIG. 1. In one implementation, the rules generator 106 may determine the rule(s) based on the scene description metadata and/or the object type(s) received from the video analytics unit 104. For example, the rules generator 106 may determine one or more rules based on identifying a matching object type as one of the plurality of object types (already stored in the analytics rules database 108) that matches with one of the one or more scene object types (received from the video analytics unit 104). For example, the rules generator 106 may determine that Object Type 0 matches with the scene object type received from the video analytics unit 104. The rules generator 106 may select Rule 0 to Rule J for configuring the camera 110. The rules generator 106 may apply Rule 0 to Rule J for operating the camera 110.

Figure 2:
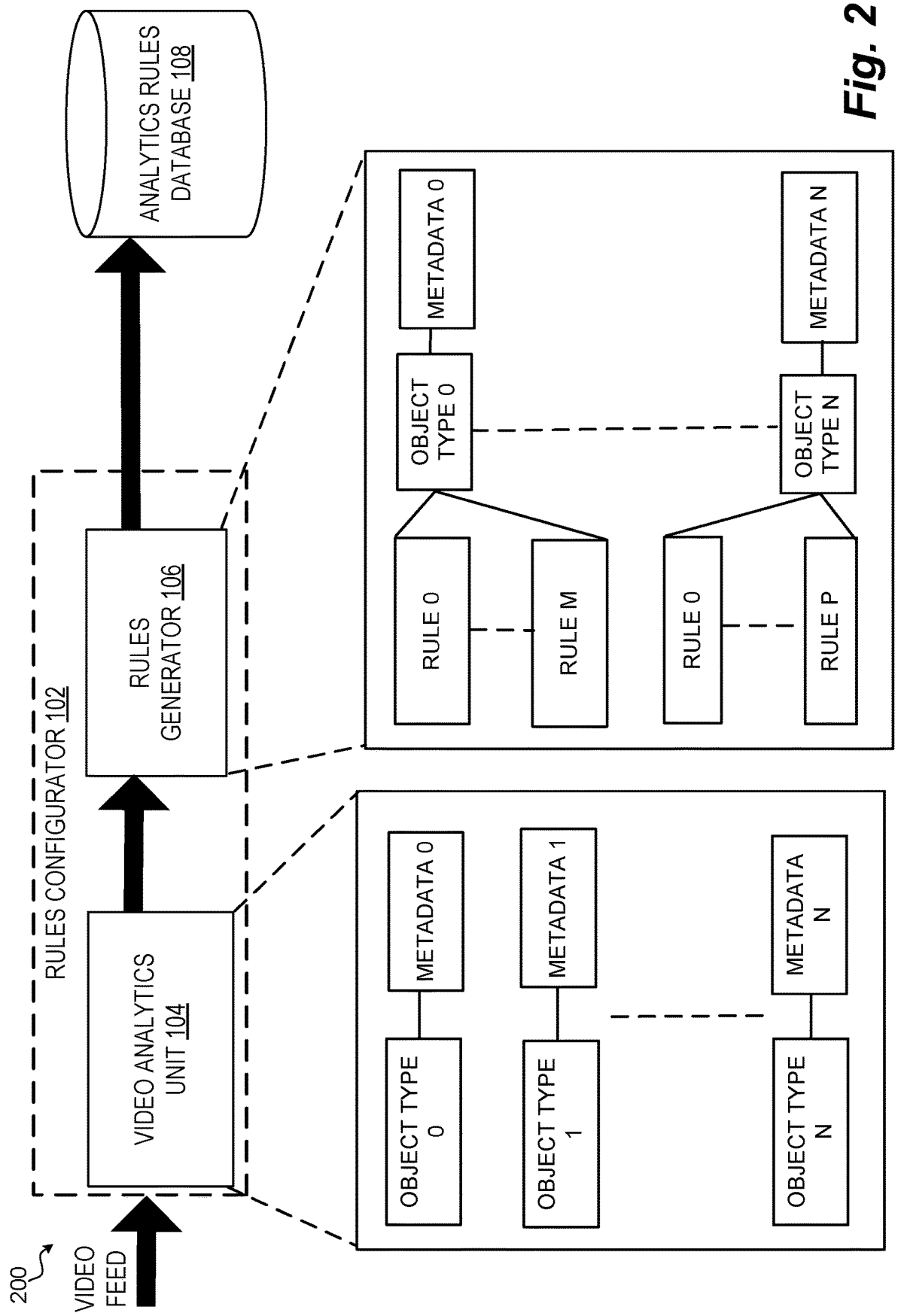
FIG. 2 is an information flow diagram for configuring rules for a camera based on scene object types.

Referring to FIG. 2, an information flow 200 represents the process of configuring profiles of a camera in the system 100 (as described above with reference to FIG. 1). The video analytics unit 104 receives a video feed (e.g., a video sequence of the scene 112 from the camera 110) and may identify the scene object types in the scene 112 as Object Type 0, Object Type 1 to Object Type N, where 0 to N is any set of positive integers (e.g., the scene object types may be in one example, but are not limited to, a car, a parking stop point, a garage entrance, etc.). The video analytics unit 104 may also determine the scene description metadata (e.g., Metadata 0, Metadata 1 to Metadata N, where 0 to N is any set of positive integers), as described above with reference to FIG. 1. For example, the video analytics unit 104 may utilize an AI or ML technique to identify the scene object types and determine the scene description metadata in the scenes. The video analytics unit 104 may send the scene description metadata (Metadata 0, Metadata 1 . . . Metadata N) and the associated scene object types (Object Type 0, Object Type 1 to Object Type N) in the scene 112 to the rules generator 106. The rules generator 106 may determine one or more rules based on the scene object types received from the video analytics unit 104. For example, the rules generator 106 may identify one or more matching object types from the plurality of object types stored in the analytics rules database 108 (e.g., the rules generator 106 may identify matching Object Type 0 and Object Type N and corresponding rules for these object types (e.g., Rule 0 to Rule M corresponding to Object Type 0, and Rule 0 to Rule P corresponding to Object Type 1, where 0 to M and 0 to P are any set of positive integers) stored in the rules analytics rules database 108). The rules generator 106 may then select Rule 0 to Rule M to apply to Object Type 0, and Rule 0 to Rule P to apply to Object Type N.

In one implementation, the video analytics unit 104 may receive a subsequent video sequence from the camera 110 (e.g., a subsequent video sequence of the scene 112). The video analytics unit 104 may detect an event based on the one or more rule applied to the subsequent video sequence. For example, Object Type 0 may be a car in the parking garage and Rule 0 to Rule M applied to the Object Type 0 may specify generating an event or notification based on theft alert system of the car raising visual/audible alarms. The video analytics unit 104 may generate the event or notification on detecting the visual/audible alarms of the theft alert system of the car. Other examples of the event may include presence of an abandoned object for more than an object movement threshold amount of time, an access controlled entrance open for a more than an open state threshold amount of time, and presence of more than a threshold number of people in an area.

The rules generator 106 may perform an operation (e.g., starting video recording of the video feed from the camera 110, sending alerts to an emergency helpline, etc.) based on the event or notification. Other examples of such operations may include generating an alarm based on the event, generating a notification including event information of the event, storing the subsequent video sequence and a plurality of video sequences in neighbor time windows of the subsequent video sequence, etc.

In one implementation, the rules generator 106 may receive one or more custom rules from a user. For example, the video analytics unit 104 may send the scene object types and the scene description metadata to the rules generator 106, and the rules generator 106 may not find a matching object type(s) (that match with the scene object type(s)) in the analytics rules database 108. The rules generator 106 may prompt a user to specify one or more rules based on the scene object types and the scene description metadata. The rules generator 106 may receive one or more custom rules for the one or more scene object types. For example, the rules generator 106 may not be able to find matching object type(s) that match with Object Type 1 in the analytics rules database 108. The rules generator 106 may prompt a user to specify rules for the Object Type 1. The rules generator 106 may receive one or more rules for the Object Type 1 from the user. In one implementation, the rules generator 106 may apply the one or more rules for the Object Type 1 received from the user for operation of the camera 110. The rules generator 106 may also store the rule(s) received from the user for Object Type 1 in the analytics rules database 108 (in a similar manner as described above with reference to FIG. 1). In another implementation, the rules generator 106 may find rule(s) corresponding to the scene object types (received from the video analytics unit 104) in the analytics rules database 108, and the rules generator 106 may still prompt the user to specify one or more custom rules for the scene object types. The rules generator 106 may apply the one or more custom rules received from the user in addition to the rule(s) in the analytics rules database 108 for operation of the camera 110.

In one implementation, the rules generator 106 may selectively enable one or more rules based on a user input. For example, the rules generator 106 may find rule(s) corresponding to scene object types (received from the video analytics unit 104) in the analytics rules database 108. The rules generator 106 may display the rule(s) corresponding to each of the scene object types (e.g., Object Type 0 to Object Type N) to the user, and allow the user to select one or more rules for each of the scene object types. The rules generator 106 may enable the one or more rules selected by the user, and apply the rules for the operation of the camera 110.

In one implementation, the rules generator 106 may allow a user to modify one or more rules based on a user input. For example, the rules generator 106 may find rule(s) corresponding to scene object types (received from the video analytics unit 104) in the analytics rules database 108. The rules generator 106 may display the rule(s) corresponding to each of the scene object types (e.g., Object Type 0 to Object Type N) to the user, and allow the user to modify one or more rules from the displayed rule(s). The rules generator 106 may apply the modified rules for the operation of the camera 110 and/or store the modified rules in the analytics rules database 108.

Figure 3:
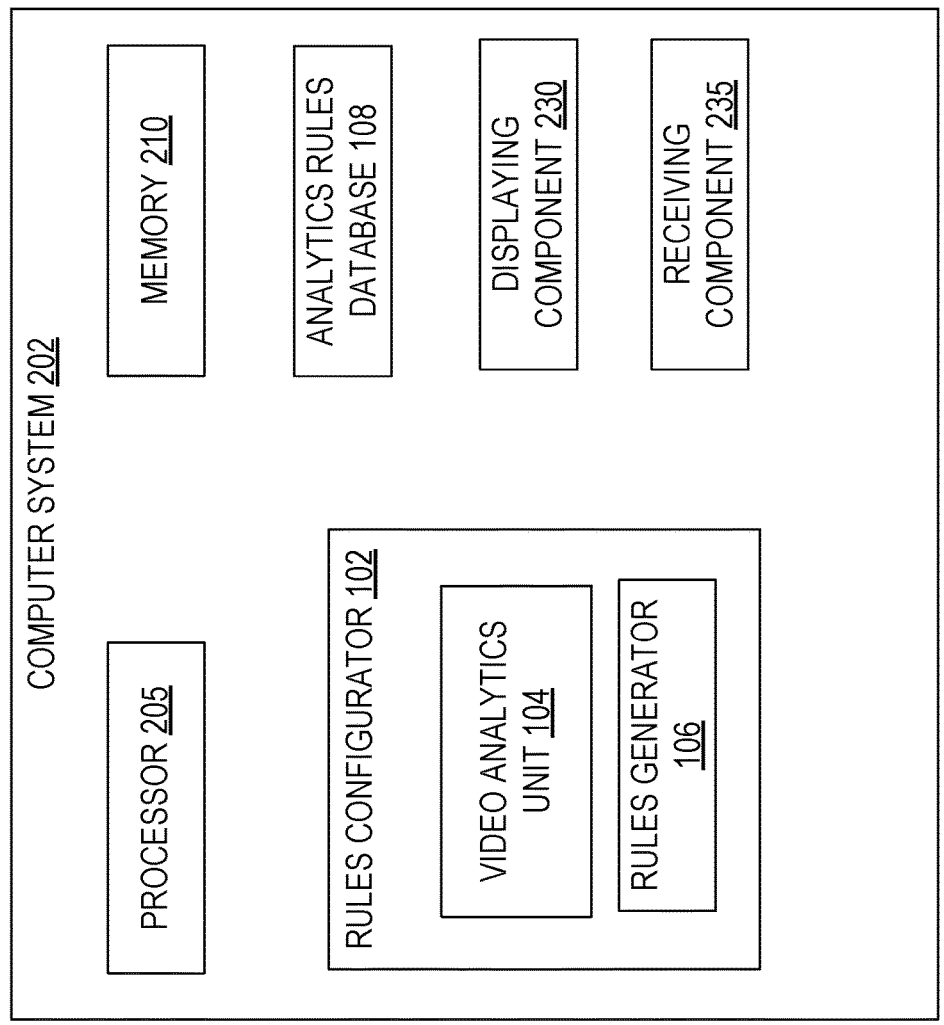
FIG. 3 is a block diagram of an example computer system operable to configuring rules for a camera based on scene object types.
Figure 4:
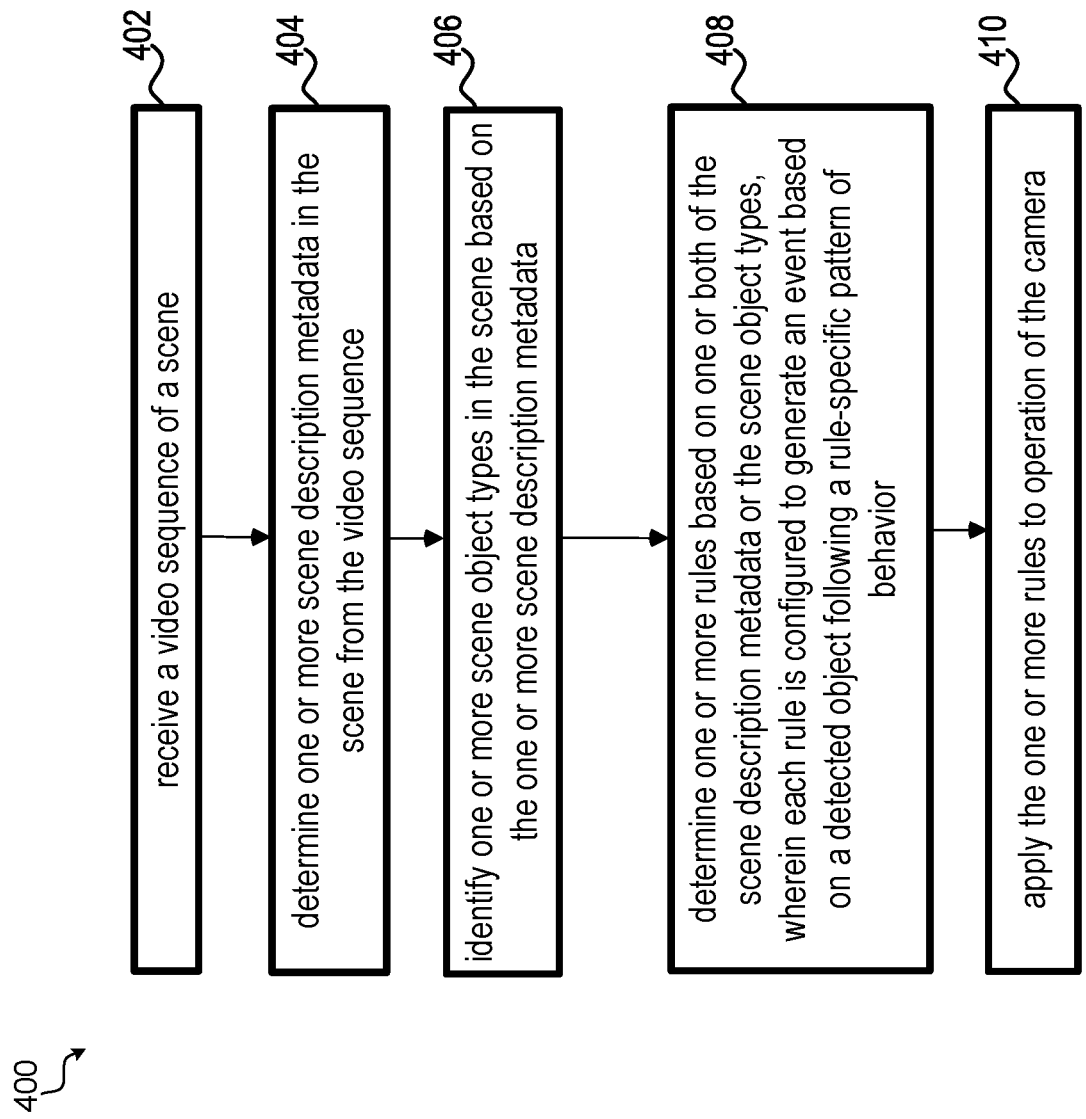
FIG. 4 is flow diagram of an example method of operation for configuring rules for a camera based on scene object types.

Referring to FIGS. 3-4, in operation, a computer system 202 may perform an example method 400 for controlling the camera 110 (as described above with reference to FIGS. 1 and 2) such as via execution of the rules configurator 102 (including the video analytics unit 104 and the rules generator 106) by a processor 205 and/or a memory 210. The computer system 202 may include the analytics rules database 108 (as described above with reference to FIGS. 1 and 2) that may temporarily or permanently store rules based on object types, a displaying component 230 that may display one or more prompts to a user for custom rules and a receiving component 235 to receive one or more inputs from a user for adding, selecting or modifying one or more rules. The operation of the example method 400 in FIG. 4 is described in combination with the computer system architecture of FIG. 3 and the overall system architecture of FIG. 1.

Referring to FIG. 4, an example method 400 of operation for controlling a camera based on video analytics object classification results in automatic configuration of analytics rules for a camera.

At block 402, the example method 400 includes receiving a video sequence of a scene from the camera. In one implementation, the processor 205 may receive the video sequence of the scene from the camera 110. For example, the processor 205 may temporarily store a first video sequence from the camera 110 at the memory 210.

At block 404, the example method 400 includes determining one or more scene description metadata in the scene from the video sequence. In one implementation, the processor may execute one or more instructions stored at the video analytics unit 104, e.g., including a ML model and/or an AI model, and/or the memory 210 to determine the one or more scene description metadata (as described above with reference to FIGS. 1 and 2).

At block 406, the example method 400 includes identifying one or more scene object types in the scene based on the one or more scene description metadata. In one implementation, the processor 205 may execute one or more instructions stored at the video analytics unit 104 and/or the memory 210, e.g., including a ML model and/or an AI model, to determine the one or more scene object types in the scene based on the one or more scene description metadata (as described above with reference to FIGS. 1 and 2).

At block 408, the example method 400 includes determining one or more rules based on one or both of the scene description metadata or the scene object types, wherein each rule is configured to generate an event based on a detected object following a rule-specific pattern of behavior. In one implementation, the processor 205 may execute one or more instructions stored in the rules generator 106 and/or the memory 210, to determine the one or more rules. For example, the instructions may include identifying a matching object type (stored in the analytics rules database 108) as one of the plurality of object types that matches with one of the one or more scene object types and selecting the one or more object-specific rules corresponding to the matching object type (as described above with reference to FIGS. 1 and 2).

At block 410, the example method 400 includes applying the one or more rules to operation of the camera. In one implementation, the processor 205 may execute one or more instructions stored in the rules generator 106 and/or the memory 210 to apply the one or more rules (determined at block 408) to configure/control the camera 110. For example, the instructions may include applying the one or more rules to operate the camera 110 and/or storing the one or more rules in the analytics rules database 108 (as described above with reference to FIGS. 1 and 2).

Figure 5:
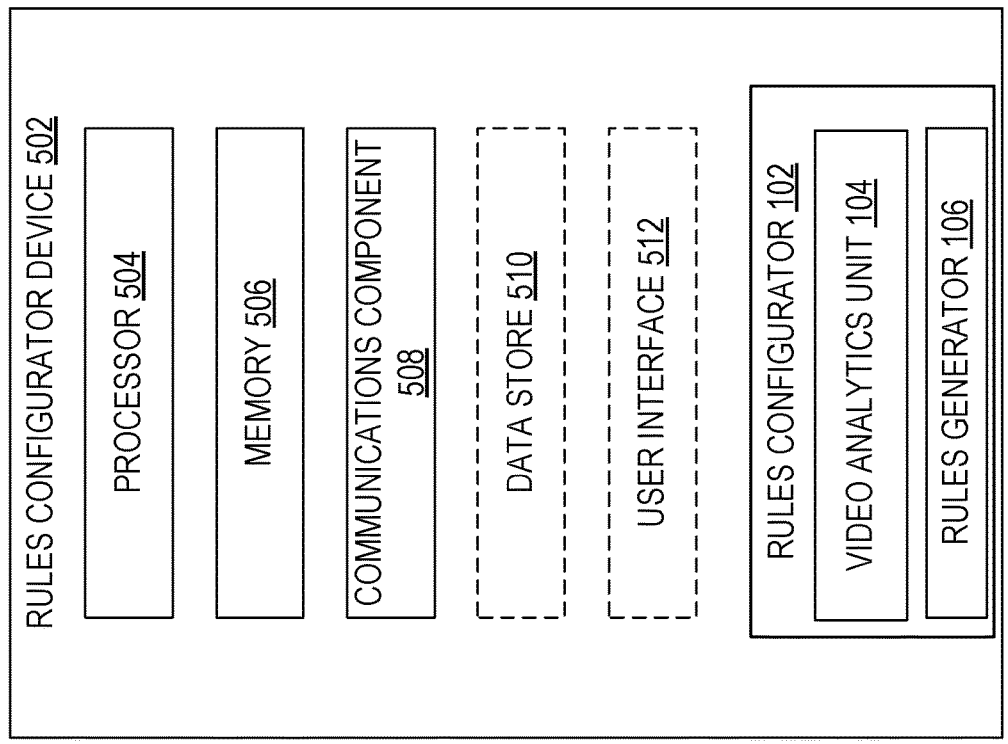
FIG. 5 is a system diagram of an example profile configuration device operable to configure rules for a camera based on scene object types.

Referring to FIG. 5, an example rules configurator device 502 for configuring profiles for a camera includes a more detailed example of the rules configurator 102 (as described above with reference to FIGS. 1-4) including a number of components configured to perform the functions described herein. The rules configurator device 502 may include some or all of the components of the computer system 202 such as the processor 504 similar to the processor 205 (as described above with reference to FIG. 3), one or more memories, such as the memory 506 similar to the memory 210, configured to execute instructions stored in the rules configurator 102. The rules configurator device 502 may optionally include a data store 510 similar to the storing component 220 and/or the analytics rules database 108, as described above with reference to FIGS. 3 and 1, respectively. The rules configurator device 502 may include a communications component 508 to enable communication of the rules configurator device 502 with one or more network devices or databases (e.g., the analytics rules database 108 when the analytics rules database 108 is stored outside the rules configurator device 502). The rules configurator device 502 may optionally include a user interface 512 to receive one or more inputs for custom rules, or selection or modification of rules (stored in the analytics rules database 108) from the user (e.g., through a keyboard, a mouse, a touchscreen, etc.) and to display information to the user (e.g., a monitor, a touchscreen, etc.). The user interface 512 may include the functionalities of the displaying component 230 and the receiving component 235 as described above with reference to FIG. 3. Various software aspects are described in terms of this example rules configurator device 502. After reading this description, it will become apparent to a person skilled in the relevant art(s) how to implement aspects of the disclosure using other computer systems and/or architectures.

The memory 506 of the rules configurator device 502 may be a main memory, preferably random access memory (RAM). The rules configurator device 502 may include a secondary memory, for example, a hard disk drive, and/or a removable storage drive representing a floppy disk drive, a magnetic tape drive, an optical disk drive, a universal serial bus (USB) flash drive, etc. The removable storage drive may read from and/or writes to a removable storage unit in a well-known manner. Removable storage unit may represent a floppy disk, magnetic tape, optical disk, USB flash drive, a solid state drive (SSD), etc., which is read by and written to the removable storage drive. As will be appreciated, the removable storage unit may include a computer usable storage medium having stored therein computer software and/or data to perform one or more operations as described above with reference to FIGS. 1-4.

In this document, the terms "computer program medium" and "computer usable medium" are used to refer generally to non-transitory computer-readable media stored on a non-transitory memory device, which may include devices such as a removable storage unit and a hard disk installed in a hard disk drive in the rules configurator device 502. These computer program products provide software to the rules configurator device 502. Aspects of the present disclosure are directed to such computer program products. Computer programs (also referred to as computer control logic) are stored in memory 506 and/or secondary memory. Such computer programs, when executed, enable the rules configurator device 502 to perform the features in accordance with aspects of the present disclosure, as discussed herein. In particular, the computer programs, when executed, enable the processor 504 to perform the features in accordance with aspects of the present disclosure. Accordingly, such computer programs represent controllers of the rules configurator device 502.

In an aspect of the present disclosure where the disclosure is implemented using software, the software may be stored in a computer program product and loaded into rules configurator device 502 using removable storage drive, hard drive, or the communications component 508. The control logic (software), when executed by the processor 504, causes the processor 504 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

As used herein, an element or step recited in the singular and proceeded with the word "a" or "an" should be understood as not excluding plural elements or steps, unless such exclusion is explicitly recited. Furthermore, references to "one embodiment" are not intended to be interpreted as excluding the existence of additional embodiments that also incorporate the recited features.

The various embodiments or components described above, for example, the camera 110, the rules configurator 102, video analytics unit 104, the rules generator 106, the analytics rules database 108, the computer system 202, the rules configurator device 502, and the components or processors therein, may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system. As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of controlling a camera, comprising:
   receiving, at a processor from the camera, a video sequence of a scene;
   determining, at the processor, scene description metadata in the scene from the video sequence;
   identifying, at the processor, a scene object type in the scene based on the scene description metadata;
   identifying, at the processor, a rule based on the rule being associated with the scene description metadata and a detected behavior of the scene object type, wherein the rule is configured to identify a region within the scene where the rule applies;
   determining, based on a rule object within the scene, a size of the region within the scene where the rule applies; and
   applying, at the processor, the rule to operation of the camera.

2. The method of claim 1, further comprising:
storing one or more object-specific rules corresponding to each of a plurality of object types; and
wherein determining the rule comprises:
identifying a matching object type as one of the plurality of object types that matches with the scene object type; and
selecting as the rule the one or more object-specific rules corresponding to the matching object type.

3. The method of claim 1, further comprising:
receiving a subsequent video sequence;
detecting an event based on the rule applied to the subsequent video sequence; and
performing an operation based on detecting the event.

4. The method of claim 3, wherein performing the operation comprises one or a combination of:
generating an alarm based on the event;
generating a notification including event information of the event; or storing the subsequent video sequence and a plurality of video sequences in neighbor time windows of the subsequent video sequence.

5. The method of claim 3, wherein the event comprises one or a combination of:
presence of an abandoned object for more than an object movement threshold amount of time; and
an access controlled entrance open for a more than an open state threshold amount of time;
presence of more than a threshold number of people in an area.

6. The method of claim 1, wherein determining the rule further comprises:
receiving one or more custom rules from a user; and
adding the one or more custom rules to the one or more rules.

7. The method of claim 1, wherein the scene description metadata comprise one or more of:
motion detection;
a rate of change of video frames;
presence of an access controlled entrance;
presence of an abandoned object in a public area;
presence of a fence;
presence of a wall; or
presence of people in a queue.

8. The method of claim 1, further comprising:
selectively enabling the rule based on a user input.

9. The method of claim 1, further comprising:
modifying the rule based on a user input.

10. An apparatus for controlling a camera, comprising:
a memory; and
a processor in communication with the memory and configured to:
receive a video sequence of a scene;
determine scene description metadata in the scene from the video sequence;
identify a scene object type in the scene based on the scene description metadata;
determine a rule based on the rule being associated with the scene description metadata and a detected behavior of the scene object type, wherein each rule is configured to identify a region within the scene where the rule applies;
determine, based on a rule object within the scene, the size of the region within the scene where the rule applies; and
apply the rule to operation of the camera.

11. The apparatus of claim 10, wherein the processor is further configured to:
store one or more object-specific rules corresponding to each of a plurality of object types; and
wherein to determine the rule, the processor is further configured to:
identify a matching object type as one of the plurality of object types that matches with the scene object type; and
select as the rule the one or more object-specific rules corresponding to the matching object type.

12. The apparatus of claim 10, wherein the processor is further configured to:
receive a subsequent video sequence;
detect an event based on the rule applied to the subsequent video sequence; and
perform an operation based on detecting the event.

13. The apparatus of claim 12, wherein to perform the operation, the processor is further configured to one or a combination of:
generate an alarm based on the event;
generate a notification including event information of the event; or
store the subsequent video sequence and a plurality of video sequences in neighbor time windows of the subsequent video sequence.

14. The apparatus of claim 12, wherein the event comprises one or a combination of:
presence of an abandoned object for more than an object movement threshold amount of time; and
an access controlled entrance open for a more than an open state threshold amount of time;
presence of more than a threshold number of people in an area.

15. The apparatus of claim 10, wherein to determine the rule, the processor is further configured to:
receive one or more custom rules from a user; and
add the one or more custom rules to the one or more rules.

16. The apparatus of claim 10, wherein the scene description metadata comprise one or more of:
motion detection;
a rate of change of video frames;
presence of an access controlled entrance;
presence of an abandoned object in a public area;
presence of a fence;
presence of a wall; or
presence of people in a queue.

17. The apparatus of claim 10, wherein the processor is further configured to:
selectively enable the rule based on a user input.

18. The apparatus of claim 10, wherein the processor is further configured to:
modify the rule based on a user input.

19. A non-transitory computer-readable medium storing instructions for configuring rules for a camera, executable by a processor to:
receive a video sequence of a scene;
determine scene description metadata in the scene from the video sequence, wherein the scene description metadata includes a classification of the scene;
identify a scene object type in the scene based on the scene description metadata;
determine a rule based on the rule being associated with the scene description metadata and a detected behavior of the scene object type, wherein each rule is configured to identify a region within the scene where the scene where the rule applies;

determine, based on rule object within the scene, a size of the region within the scene where the rule applies; and
apply the rule to operation of the camera.

\* \* \* \* \*